United States Patent [19]
Larsen

[11] Patent Number: 4,469,468
[45] Date of Patent: Sep. 4, 1984

[54] APPARATUS FOR JUMPING A MOVING OBJECT FROM ONE PLACE TO ANOTHER AND A METHOD OF USING IT

[76] Inventor: Ole F. Larsen, Fasanvaenget 62, DK-6700 Esbjerg, Denmark

[21] Appl. No.: 302,416
[22] PCT Filed: Jan. 16, 1981
[86] PCT No.: PCT/DK81/00007
   § 371 Date: Sep. 16, 1981
   § 102(e) Date: Sep. 16, 1981
[87] PCT Pub. No.: WO81/02054
   PCT Pub. Date: Jul. 23, 1981

[30] Foreign Application Priority Data
   Jan. 18, 1980 [GB] United Kingdom ............... 8001715
   Oct. 13, 1980 [GB] United Kingdom ............... 8032934

[51] Int. Cl.³ .............................................. F16L 57/00
[52] U.S. Cl. ................................... 405/157; 405/211
[58] Field of Search ............... 405/157, 158, 172, 211, 405/74; 138/110

[56] References Cited
U.S. PATENT DOCUMENTS
4,077,222 3/1978 Larsen ........................... 405/157 X
4,242,010 12/1980 Gjerde et al. ...................... 405/157

FOREIGN PATENT DOCUMENTS
2367243 5/1978 France ................................ 405/157
7707168 12/1977 Netherlands ....................... 405/157
WO79/00108 3/1979 PCT Int'l Appl. .
2035504 6/1980 United Kingdom ............... 405/157

Primary Examiner—Ernest R. Purser
Assistant Examiner—Beverly E. Hjorth
Attorney, Agent, or Firm—Diller, Ramik & Wight

[57] ABSTRACT

An apparatus (2 or 3) for jumping a moving object (10) from one place to another. Fields of application include protection of submarine installations such as pipelines (1) and cables, from damage due to dragging anchors (10) and fishing gear. The apparatus comprises a plate-like device (2 or 3) that is unstable with regard to a horizontal force over a certain strength. The deformation of the device (2 or 3) caused by such horizontal force results in a steeper direction of the resultant (14) acting on the edge (6). The frictional resistance combined with the passive soil pressure (7) thereby become able to withstand the horizontal force from the moving object (10). Subsequently the device (2 or 3) carrying the object (10) will turn around the edge (6) and thereby lift the object (10) over the installation (1). Several alternative designs of the device (2 or 3) and a method of installing it are disclosed.

7 Claims, 8 Drawing Figures

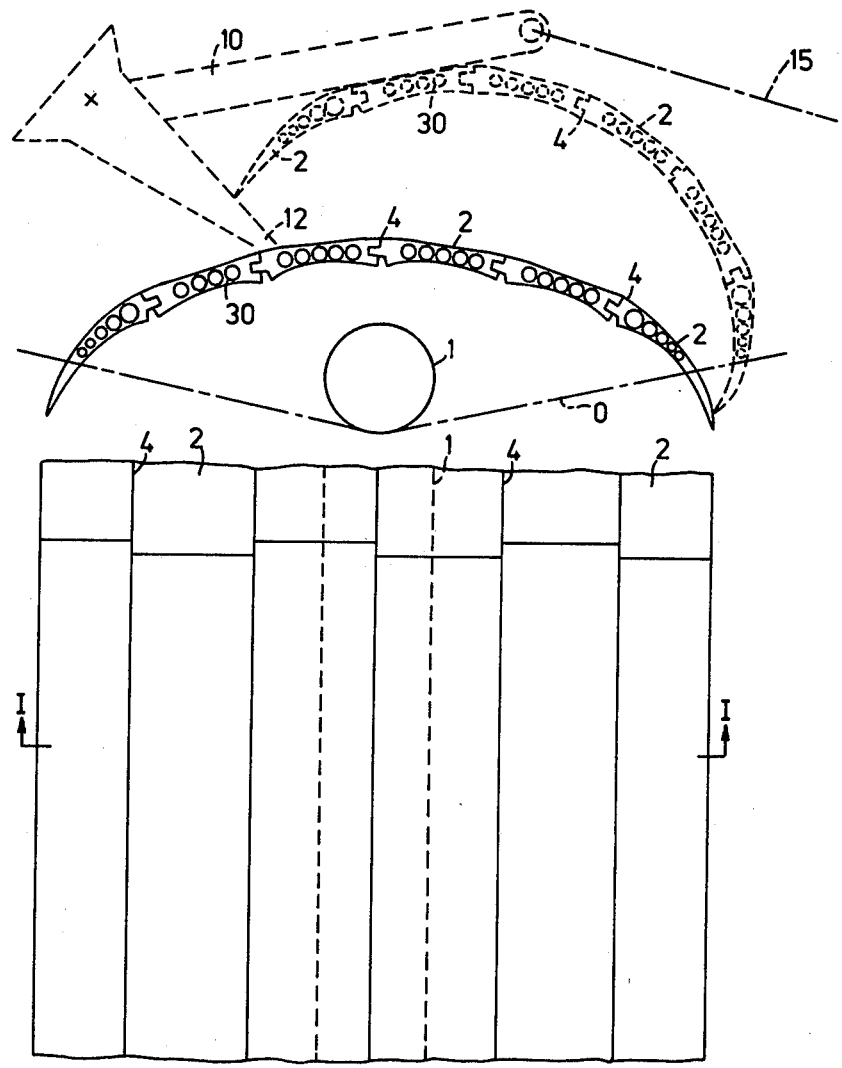

FIG.6
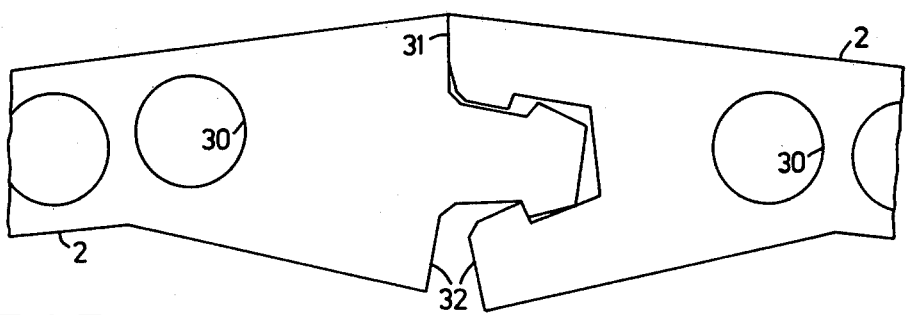
FIG.7
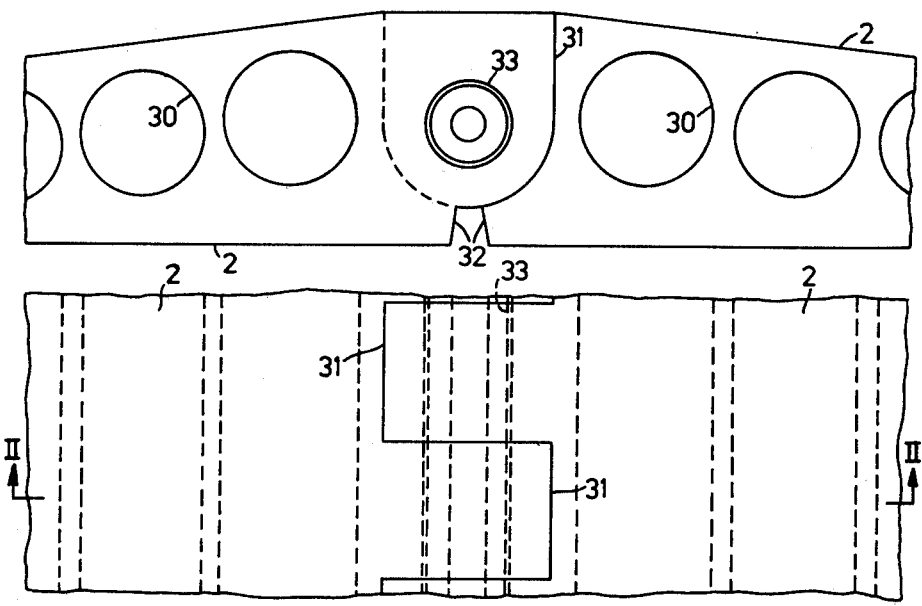
FIG.8

APPARATUS FOR JUMPING A MOVING OBJECT FROM ONE PLACE TO ANOTHER AND A METHOD OF USING IT

TECHNICAL FIELD

The invention relates to a device for lifting a moving object in a curved movement, in order, for example, to prevent damage to another object placed underneath the device.

An important field of application of the invention is protection of submarine installations such as pipelines and cables from damage due to dragging ships' anchors and fishing gear.

BACKGROUND ART

Several types of covers to protect submarine pipelines have been devised. U. K. Pat. No. 1 535 170, for example, discloses a cover with one hinge along its centerline.

To achieve the desired pivot of the cover around one of its two supporting edges and thereby lift of the anchor over the pipeline, if a ship's anchor catches hold of the other edge, a strong reactionary horizontal force against the first-mentioned edge, however, is required.

With only one hinge along the centerline of the cover such strong reaction will occur only in special cases, e.g. when at least two parallel covers are placed close against each other. In the ordinary case the anchor chain will prevent upward movement of the central portion of the cover.

DISCLOSURE OF THE INVENTION

It is therefore an object of the present invention to provide a device that can lift a moving object also in cases where the local conditions do not provide for such reactionary force against pivot of the device.

The principle of the present invention is to utilize the frictional resistance to a much farther extent than the known prior systems do.

In the following description and in the drawings the invention will be illustrated by way of the example of a submarine pipeline to be protected from damage due to dragging ships' anchors.

The protective system comprises an upwardly convex covering plate placed over top of the pipeline, so that the plate rests on its two longitudinally extending edges.

Due to several longitudinally extending hinges in the cover, or a specially designed unstable structure of it, the cover to a certain point is easily deformed by horizontal forces over a certain impetus.

If an anchor is dragged across the pipeline, the flukes of the anchor may catch hold of the edge of the cover. Hereby the cover will deform. The tangential point of its surface in which the anchor chain leaves the cover will rise and shift to a higher point nearer to the edge opposite the anchor.

The resulting force acting on this edge thereby will become steeper, so that the frictional resistance between the edge and the ground can be utilized to withstand the horizontal drag of the anchor chain.

Due to the moment of this drag about this edge, the cover consequently will turn around this edge and hereby lift the anchor in a curve over the pipeline, so that damage to this is prevented.

The removed section of the cover thereafter has to be repositioned.

BRIEF DESCRIPTION OF DRAWINGS

FIG. 4 is a cross-section taken along the line I—I of FIG. 5 of another alternative structure of a device covering a pipeline, FIG. 5 is a plan view on enlarged scale of the device shown in FIG. 4, FIG. 6 is a cross-section on enlarged scale of a special type of hinge, FIG. 7 is a cross-section on enlarged scale taken along the line II—II in FIG. 8 of an alternative type of hinge, FIG. 8 is a plan view on enlarged scale of the hinge shown in FIG. 7.

BEST MODE OF CARRYING OUT THE INVENTION

Figure 1:
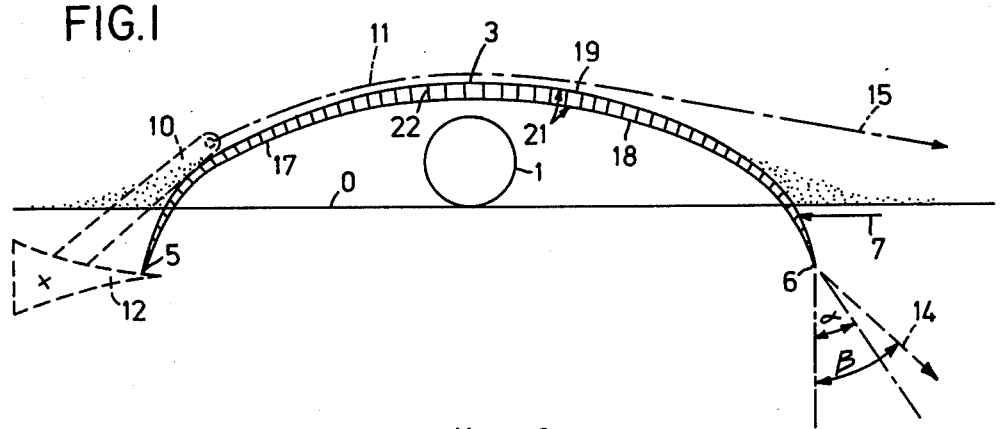
FIG. 1 is a cross-section of a pipeline protected by a covering device in accordance with the invention.
Figure 2:
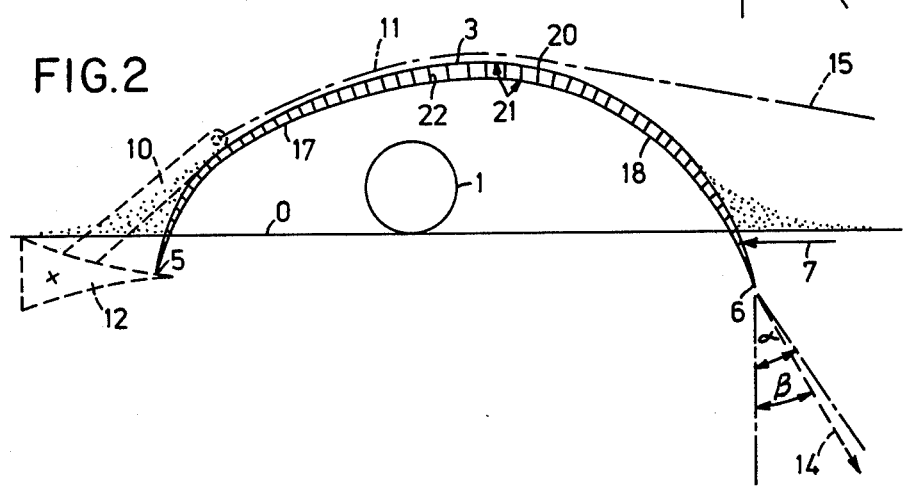
FIG. 2 is the same as FIG. 1, but the cover is here deformed by a dragging anchor.

Consider a case where the ground consists of a non-clayey kind of soil, e.g. sand, which cannot provide sufficient resistance 7 to horizontal forces, so as to allow for the desired lift of a dragging anchor 10 hooking the edge 5 of the cover 3, FIGS. 1-2.

By use of the present type of cover, the deformation of this will cause the direction of the resultant 14 acting on the edge 6 opposite the anchor 10 to change to such degree that the earth pressure 7 in combination with the friction will provide the required reaction on this edge:

The direction of the force 14 exerted by the edge on the floor 0 results from the combination of the more or less horizontal drag force 15 of the anchor chain 15 and the vertical weights of the cover 3 and the anchor 10. If the angle $\beta$ between the vertical and this resulting direction of 14 is smaller than the angle $\alpha$ corresponding to the coefficient of friction, k, relating to the combination of the floor and edge materials (tang $\alpha = k$), the friction between edge and floor alone will prevent horizontal displacement of the edge 6 in relation to the floor.

To maximize the angle $\alpha$, the edges 5 and 6 therefore should be made of such material and be shaped with such uneven and possibly saw-teethed (16) lower surfaces, that the coefficient of friction, k, is maximized.

To minimize the angle $\beta$, the invention presents the following characteristic feature of the cover 3:

The structure of the cover is designed in such way that it is unstable with regard to horizontal forces over a certain strength.

If the flukes 12 of an anchor 10 catches hold of the edge 5, FIG. 2, the adjacent side 17 of the cover 3 first will tend to straighten out, and the opposite side 18 of the cover will bend correspondingly and form a sharper curve than the original curvature of the cover, FIG. 2. Hereby the actual tangential point 20 in which the anchor chain 15 leaves the surface of the cover, will move higher and closer to the vertical through the edge 6 than the initial tangential point 19, FIG. 1.

Consequently, the direction of the force 14 exerted on the floor by the edge 6 will become steeper. And if its angle $\beta$ with the vertical becomes smaller than $\alpha$, the edge 6 will be prevented from skidding, even without any passive soil pressure 7.

Thereafter the edge 5 with the hooking anchor 10 will start moving toward the pipeline. And, provided that the stiffness of the cover is properly distributed over its surface, the actual tangential point 20 continuously will move higher and closer to the vertical through the edge 6.

Before the flukes 12 of the anchor 10 reaches the pipeline 1, the deformation of the cover, however, will reach a maximum, where an increased structural stability. The point of maximum deformation is first attained at the side 18 and thereafter gradually moves toward the side 17 of the cover. When all portions of the cover have become stiffened, the whole cover will turn around the edge 6 and thereby lift the anchor 10 over the pipeline 1, cf. FIG. 4 in which this situation is shown with dotted lines for an alternative design of the cover.

Provided that the cover 3 is made of elastic material and is continuous for very long lengths, it may be able to slip back to its original position, when the anchor has fallen off the edge 5.

To prevent the edge 5 from wedging into the space between anchor-shaft and -flukes, and to keep the anchor-flukes 12 away from the pipeline 1, the lower portion of either side of the cover may be bent around to be more or less vertical. Alternatively, the lower portion at either edge 5 and 6 may be provided with some other kind of expansion. Smaller anchors and fishing gear hereby will be prevented from catching hold of the edge and will slide on top of the cover without moving it.

The appropriate structure of the cover to obtain the above functioning may be obtained in various ways:

As an example FIGS. 1–2 show cross-sections of a cover 3 consisting of two substantially parallel plates 21 connected only by the members 22. These may be longitudinally extending parallel plates that are perpendicular to the plates 21. As there are no diagonals in the cross-section, such as in ordinary bearing structures, this structure is unstable with regard to horizontal forces. To begin with the two plates 21 can be mutually displaced in their own planes, without much resistance from the members 22. A cover with such structure caught by an anchor therefore initially will bend on its side opposite the anchor, until the deformation of the cover has reached the point where the deformation itself prevents the two sheets 21 from mutual displacement. From this moment on the two sheets together with the connecting members 22 will be interlocked and form a stable structure able to withstand the static moment due to the weight of the anchor and the cover itself.

Depending on the elasticity of the materials involved, the two sheets 21 may be kept at a distance all the way down to the lower edges 5 and 6, or they may meet and be joined together along these edges, FIGS. 1–2. Appropriately the distance between the two sheets 21 varies from a maximum at the centerline to a minimum at the edges of the cover, cf. FIGS. 1–2. Maximum strength of the cover hereby is obtained at the centerline where the maximum bending moment will occur during the anchor's ride on the cover over the pipeline. Furthermore, the minimum strength and stability of the structure of the cover occurs at the edge portions where the bending moment will be minimum, and where maximum bending of the cover will be needed.

The cover shown in FIGS. 1–2 may be made of for example aluminium, glassfibre-reinforced polyester, other sort of plastic, or steel that may be coated with for example titanium.

Figure 3:
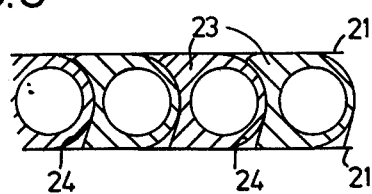
FIG. 3 is a cross-section of an alternative structure of the device according to the invention.

Another example of structure of the cover is shown in FIG. 3 which is a cross-section perpendicular to the pipeline, where the two sheets 21 in stead of the members 22 are interconnected by elements 23 which to a certain point can rotate in relation to each other. The rotation may be limited by an expansion 24 of each element 23.

The elements 23 for instance may be made of concrete.

In this design one of the sheets 21 may be replaced by strings of appropriate material, e.g. aromatic polyamide.

The sheets 21 may be made of steel, aluminium, titanium or other metal, or glassfibre-reinforced polyester, plastic or other suitable material.

A third alternative design of the cover or elongated upwardly convex plate member is shown in FIGS. 4–7. The cover consists of a plurality of individual long parallel longitudinal elements or plates 2 joined together by hinges 4. To save material, the elements or plates 2 in their longitudinal direction may contain channels 30.

In their longitudinal direction the elements or plates 2 may be interconnected by pivot means in the form of interdigitated tongues and grooves, as is illustrated in FIGS. 4 and 6.

The hinged connection or pivot means between two neighbouring elements 2 may be formed in several ways. The type of hinge or pivot means shown in FIG. 6 is appropriate in case the elements 2 are fabricated by an extrusive type of fabrication.

FIGS. 7–8 show a more traditional hinge or pivot means with a pin 33 through the staggered expansions of the two elements 2.

In both types of hinges or pivot means their pivoting movement is limited in either direction by pans or means 31 and 32, respectively. When the cover 2 is placed over the pipeline 1, and the weight of the cover tends to straighten out the convex cover, the upper pans 31 of neighbouring elements 2 will be pressed close together. If a dragging anchor hooks one edge of the cover and turns the cover around the other edge, the lower pans 32 will limit the bend of the cover.

Thus the means 31 (FIG. 6) is operative for establishing a predetermined initial minimum convexity of the plate member or cover when the longitudinal edges, such as 5 and 6 of FIG. 1, are disposed relative to a supporting surface while the means 32 are operative for responding to relative movement of the longitudinal edges 5, 6 toward each other causing a reduction in the predetermined distance, an increase of the initial minimum convexity and for limiting such movement and establishing a predetermined maximum convexity of the plate member greater than the initial miminum convexity.

A preferred material for fabrication of the elements 2 is concrete which may be reinforced.

To reduce the lifting forces of the currents and waves, and/or to further sedimentation under the cover 2 or 3, if this is desired, at least portions of the cover may be perforated, especially along its top.

In many cases no sedimentation underneath the cover is desirable, since an open space between pipeline and cover allows for convenient regular inspection of the pipeline by means of an unmanned TV-camera pulled by strings along the pipeline from either end of the pipeline.

Industrial Applicability

The invention may be used in cases where a dragged object is to be lifted over an other object, over a cleft, etc. The length of the lifted device in direction perpendicular to the direction of movement of the dragged object may be suited to the local circumstances.

When used for protection of a submarine pipeline, cable or the like, the protective cover may be fabricated on land, assembled to very long lengths, supplied with buoyancy means, and towed to the installation site at a suitable level off the bottom. The distance between cover and bottom during the tow may be controlled by heavy chains hanging from the cover and dragging on the bottom.

We claim:

1. Apparatus for jumping a dragged object from one place to another comprising an elongated upwardly convex plate member defined by opposite end edges and opposite generally parallel terminal longitudinal edges, said apparatus being supported relative to a supporting surface only upon said longitudinal edges with said longitudinal edges being normally spaced a predetermined distance from each other, said plate member being defined by at least three longitudinal plates disposed in side-by-side relationship to each other and imparting said upwardly convex configuration to said plate member, pivot means between adjacent ones of said at least three plate members for effecting relative pivoting movement therebetween along axes generally parallel to said longitudinal edges, means for establishing a predetermined initial minimum convexity of said plate member upon said longitudinal edges being disposed relative to a supporting surface, and means responsive to relative movement of said longitudinal edges toward each other causing a reduction in said predetermined distance and an increase of said initial minimum convexity for limiting such movement and establishing a predetermined maximum convexity of said plate member greater than said initial minimum convexity.

2. The apparatus as defined in claim 1 wherein said initial minimum convexity establishing means are abutment means between adjacent plates.

3. The apparatus as defined in claim 2 wherein said abutment means are abutment surfaces between adjacent plates.

4. The apparatus as defined in claim 3 wherein said abutment means are abutment surfaces between adjacent plates.

5. The apparatus as defined in claim 1 wherein said means for establishing maximum convexity are abutment means between adjacent plates.

6. The apparatus as defined in claim 5 wherein said abutment means are abutment surfaces between adjacent plates.

7. The apparatus as defined in claim 5 wherein said initial minimum convexity establishing means are abutment means between adjacent plates.

* * * * *